United States Patent [19]
van der Lely

[11] 4,151,885
[45] May 1, 1979

[54] SOIL CULTIVATING IMPLEMENTS

[76] Inventor: Cornelis van der Lely, 7 Brüschenrain, Zug, Switzerland

[21] Appl. No.: 765,349

[22] Filed: Feb. 3, 1977

[30] Foreign Application Priority Data

Feb. 5, 1976 [NL] Netherlands ............... 7601150

[51] Int. Cl.² ............................................. A01B 33/06
[52] U.S. Cl. .................................................... 172/59
[58] Field of Search ................ 172/59, 111, 123, 126; 308/189 R, 190, 207 R, 208; 156/255

[56] References Cited

U.S. PATENT DOCUMENTS

| 2,394,771 | 2/1946 | Hill | 172/59 X |
| 3,111,917 | 11/1963 | Dawrs | 172/49 X |
| 3,616,862 | 11/1971 | Lely | 172/49 X |
| 3,920,079 | 11/1975 | Lely | 172/59 |

FOREIGN PATENT DOCUMENTS

| 7216409 | 2/1972 | Netherlands | 172/59 |
| 7103297 | 9/1972 | Netherlands | 172/59 |
| 1386842 | 3/1975 | United Kingdom | 172/59 |

Primary Examiner—Richard J. Johnson

Attorney, Agent, or Firm—William B. Mason; Penrose Lucas Albright

[57] ABSTRACT

A cultivator implement has a row of soil working members mounted on upwardly extending shafts. The shafts extend to meshed pinion gears housed within an elongated hollow frame portion. Below each pinion two spaced apart bearings support the shaft and the bearings are mounted in a housing that is bolted to the upper surface of the lower part of the frame portion. The lower part can be profiled to receive the housings which include an enlarged circular or rectangular flange which is bolted to the profiled lower part. Each working member has a carrier mounted on a lower shaft portion and a group of tines is journalled for free rotation about an axis located at each opposite end of the carrier. The tines are secured in holders on arms and are angled to trail with respect to their normal directions of rotation. The working members each have two groups of tines that can be mounted to rotate in relative opposite directions and the tines normally move rearwardly between the axis of rotation of the corresponding member and the axis of rotation of the group as a whole.

8 Claims, 5 Drawing Figures

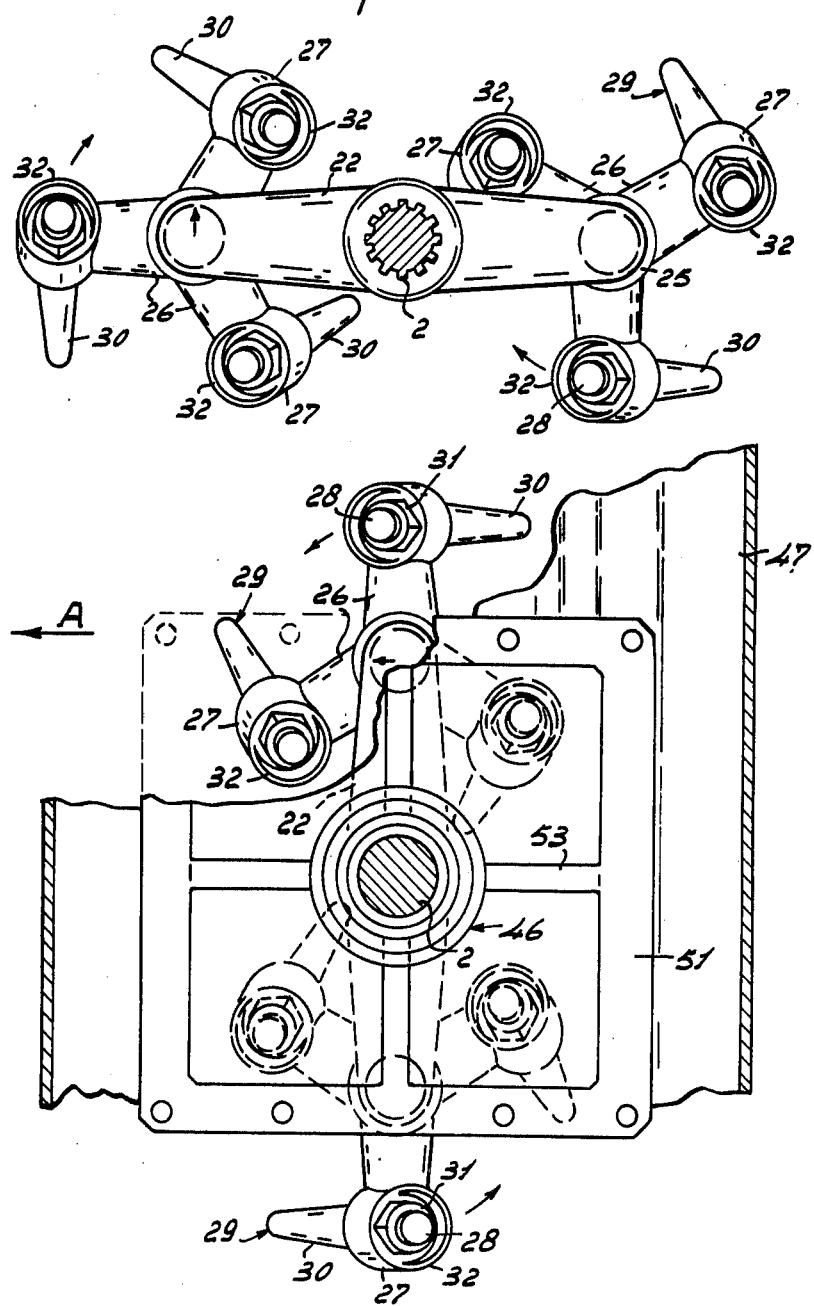

SOIL CULTIVATING IMPLEMENTS

Figure 1:
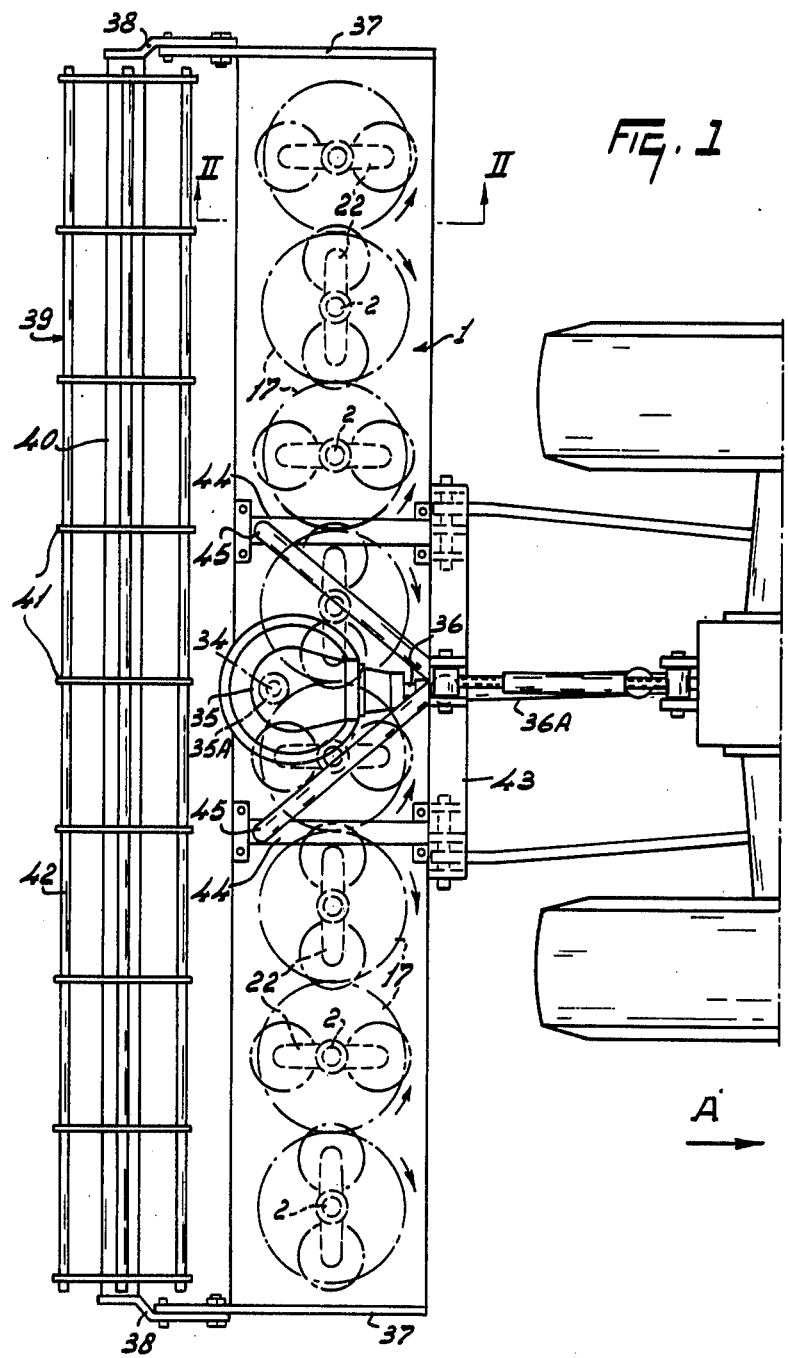
Figure 2:
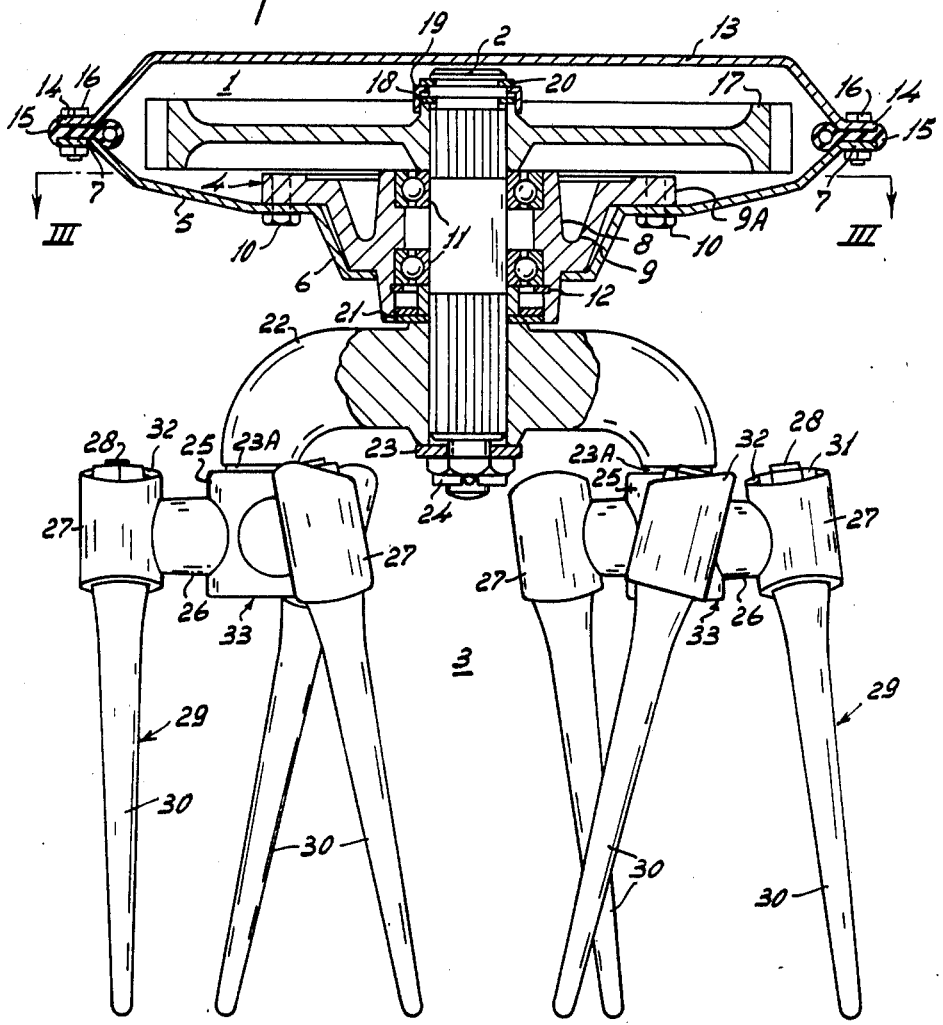
Figure 3:
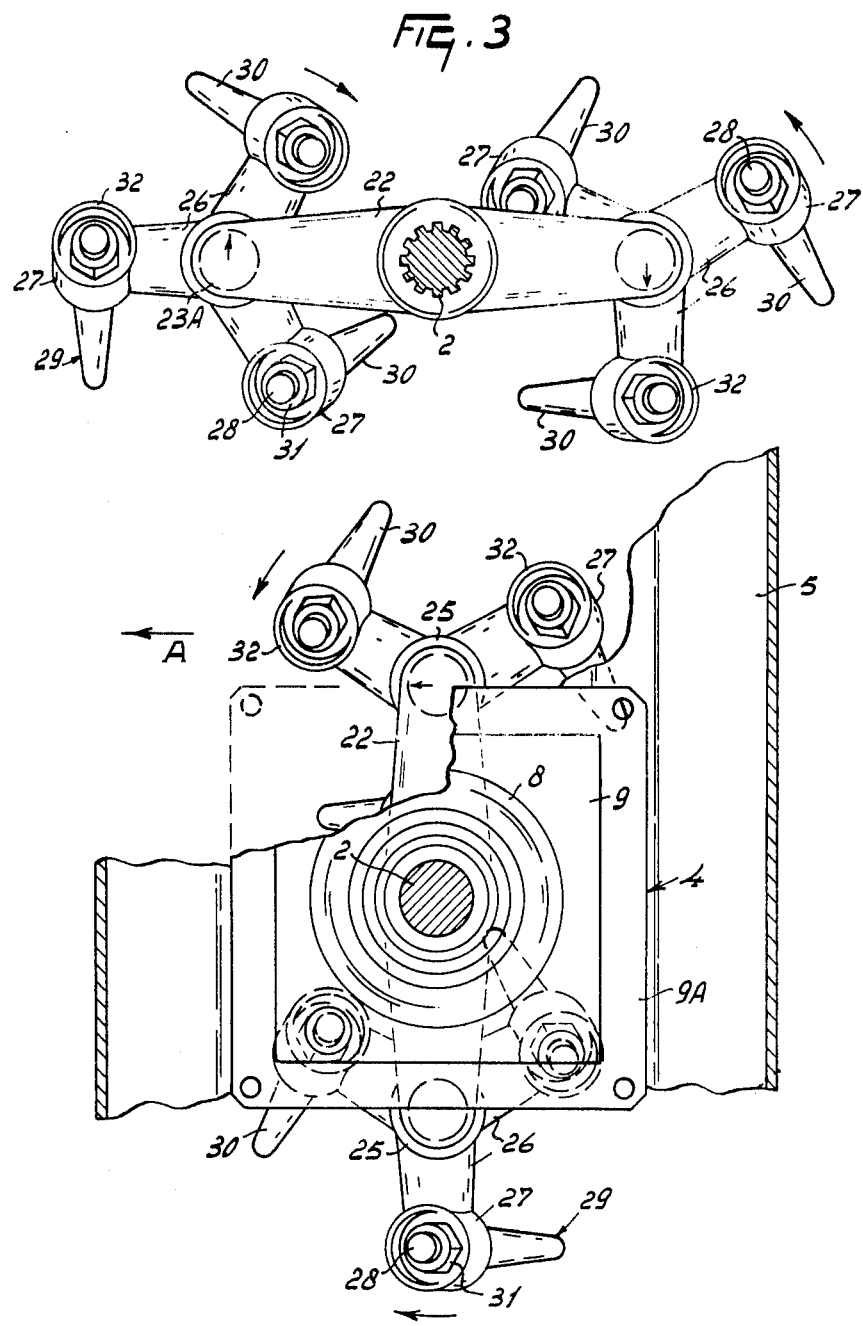
Figure 4:
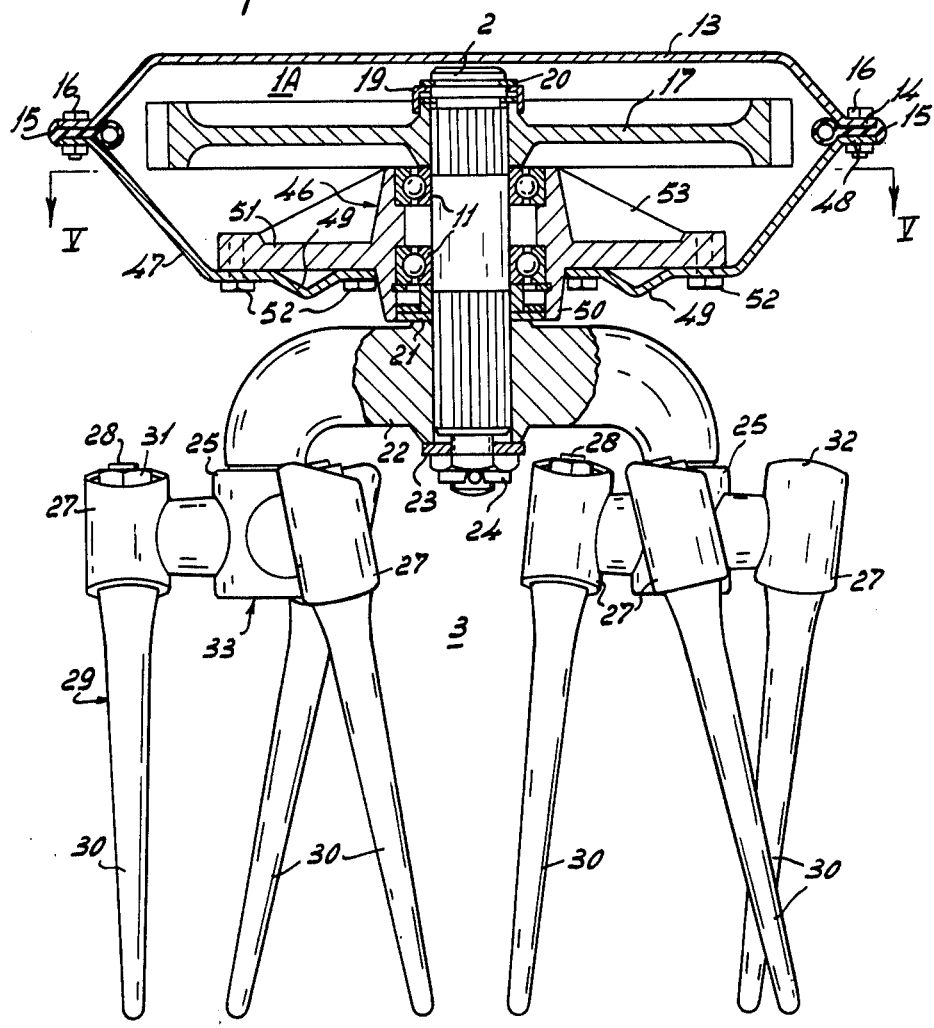

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a section, to an enlarged scale, taken on the line II—II in FIG. 1, FIG. 3 is a section taken on the line III—III in FIG. 2, FIG. 4 is a section to the same scale as FIG. 2 and taken in a similar position but illustrates an alternative embodiment of some parts of the implement, and FIG. 5 is a section taken on the line V—V in FIG. 4.

Referring firstly to FIGS. 1 to 3 of the accompanying drawings, the soil cultivating implement that is illustrated therein comprises a frame portion 1 of hollow box-shaped formation that extends substantially horizontally transverse, and usually (as illustrated) substantially perpendicular, to the intended direction of operative travel of the implement which is indicated in FIGS. 1 and 3 of the drawings by the reference and similarly in FIG. 5 of the drawings. A plurality of shafts 2, of which there are eight in the embodiment that is being described, are rotatably mounted in the hollow frame portion 1 at regularly spaced apart intervals, the eight shafts 2 occupying upwardly extending positions which are such that their longitudinal axes (axes of rotation) will usually be vertically or substantially vertically disposed. It is preferred, but is not essential, that the longitudinal axes (axes of rotation) of the eight shafts 2 in the single row thereof should be spaced apart from one another by distances of 37.5 centimeters. The lowermost end of each shaft 2 projects from beneath the bottom of the hollow frame portion 1 and there carries a corresponding rotary soil working or cultivating member 3 which will be described in further detail below. Each shaft 2 is rotatably supported in the hollow frame portion 1 by means which includes a bearing housing 4 fastened by bolts 10 to a lower part 5 of the frame portion 1, said lower part 5 being formed from sheet metal which conveniently has a thickness of substantially 6 millimeters.

It can be seen from FIG. 2 of the drawings that the lower part 5 of the hollow frame portion 1 comprises a plurality of planar portions that are integrally interconnected by bends. Commencing in a central bottom region of the lower part 5, a trough 6 is produced that extends throughout the transverse length of the frame portion 1 and that is shaped to receive and secure in place the successive housings 4. The trough 6 has a substantially horizontally disposed and substantially flat bottom that is apertured to receive the bearing housings 4, said bottom being integrally connected by sharp angular bends to two upwardly divergent portions that lie at the front and the rear of said trough 6 with respect to the direction A. The upper edges of the upwardly divergent portions are bent over outwardly to form substantially horizontal portions with which the bolts 10 co-operate to secure the bearing housings 4 to the lower part 5. The front and rear edges, relative to the direction A, of the two substantially horizontal portions merge by way of small angular bends into two further planar portions that are in upwardly divergent relationship with each of the two portions, however, being inclined to the horizontal by only a few degrees. The front and rear edges, relative to the direction A, of these two portions are connected by somewhat sharper angular bends to still further planar portions which are also in upwardly divergent relationship, both of them being more steeply inclined to the horizontal than are the two portions which were last discussed. Finally, the uppermost and outermost edges of the lower part 5 are bent over to form corresponding coplanar and substantially horizontally disposed lower clamping rims 7.

Each of the bearing housings 4 comprises a central substantially cylindrical portion 8 whose lower end projects downwardly through the corresponding circular aperture in the bottom of the trough 6. The substantially cylindrical portion 8 of each bearing housing 4 is surrounded by a fastening portion 9 of that bearing housing which fastening portion 9 is of inverted frusto-conical configuration. Each fastening portion 9 affords the greater part of the corresponding bearing housing 4 and is provided at its uppermost end with a flange 9A that is substantially square in shape when viewed in plan (FIG. 3). The bolts 10 which secure the bearing housings 4 to the lower part 5 of the hollow frame portion 1 actually co-operate with screwthreaded holes at the four corners of each flange 9A. A circle centered upon the axis of rotation of one of the shafts 2 and intersecting the four corners of the corresponding flange 9A has a diameter of substantially 30 centimeters in the embodiment that is being described so that the flanges 9A abut against the underlying substantially horizontally disposed portions of said lower part 5 throughout quite large lengths and thus have quite large areas of contact therewith. As seen in plan view (FIG. 3), both the bottom of the trough 6 and its steeply upwardly inclined front and rear wall portions are located inside the margins of the fastening portion 9 of each successive bearing housing 4. The centers of the circular apertures in the bottom of the trough 6 are spaced apart from one another by the same distances as are the longitudinal axes (axes of rotation) of the shafts 2 and thus, in the embodiment that is being described, by the preferred distance of 37.5. centimeters.

The bearing housings 4 are of cast formation and the internal bore of the substantially cylindrical portion of each of them is stepped to receive upper and lower ball bearings 11 that are vertically spaced from each other. The inner races of the two ball bearings 11 surround the corresponding shaft 2 while their outer races co-operate with the internal surface of the substantially cylindrical portion 8 of the bearing housing 4 under consideration and with the shoulders or steps that are formed in that surface. The outer race of the lower ball bearing 11 also co-operates with a circlip 12 whose outer edge is sprung into a groove in the inner wall of the corresponding substantially cylindrical portion 8 at a location towards, but above, the lowermost end thereof. The upper surfaces of both the inner and outer races of the upper ball bearing 11 are substantially coplanar with the open upper end of the substantially cylindrical portion 8 concerned and with the upper surface of the flange 9A of the associated fastening portion 9. Each shaft 2 projects upwardly above the top of the corresponding bearing housing 4 in the interior of the hollow frame portion 1 and lies within an upper part 13 of that frame portion 1. The simple cross-sectional shape of the upper part 13 is clearly visible in FIG. 2 of the drawings and it will be seen therefrom that the front and rear edges, with respect to the direction A, of said portion 13 exhibit substantially coplanar and substantially horizontally disposed upper clamping rims 14 that extend throughout the transverse length of the frame portion 1, said upper clamping rims 14 registering with the underlying lower clamping rims 7 with the provision of an intervening gasket 15. A plurality of substantially vertically disposed bolts 16 clamp the registering rims 7 and 14 and the intervening gaskets 15 to one another, said bolts 16 being substantially regularly spaced apart from one another along the lengths of the rims 7 and 14. The gaskets 15 are formed from a relatively hard synthetic plastics material and have a strip-shaped configuration whose cross-sectional shape can be seen in FIG. 2. This shape exhibits a tubular inner edge region that is located inside the hollow frame portion 1 and a rounded-off outer edge region that lies immediately beyond the outermost edges of the clamping rims 7 and 14.

That portion of each shaft 2 which projects upwardly above the corresponding bearing housing 4 is splined for co-operation with the matchingly splined hub of a corresponding straight-toothed or spur-toothed pinion 17. There are thus eight of the pinions 17 and each of them has an effective diameter (in this case, 37.5. centimeters) which is such that its teeth are in mesh with those of its neighbour, or with those of both of its neighbours, in the single row of eight pinions 17. The lower end of the hub of each pinion 17 bears against the top of the inner race of the corresponding upper ball bearing 11 and upward axial displacement thereof along the shaft 2 concerned is prevented by a circlip 18 formed in two parts to co-operate with a groove formed in the shaft 2 immediately above its upper splines, an inverted cup washer 19 whose cylindrical wall embraces the outer edges of the two parts of the circlip 18, and a second circlip 20 of unitary construction whose inner edge is sprung into a further groove in the shaft 2 very close to the uppermost extremity of that shaft. It will be noted that each cup washer 19 not only maintains the two parts of the corresponding circlip 18 in their appointed effective positions but also acts as a screen the lowermost end of its cylindrical wall being disposed in surrounding relationship with the upper end of the hub of the corresponding pinion 17.

An annular cover plate or washer 21 is arranged just inside the otherwise open lower end of the cylindrical portion 18 of each bearing housing 4 and retains oil seals which are not shown in detail in position between itself and the corresponding lower ball bearing 11, said oil seals thus being located internally of the lower end of the cylindrical portion 18 of the bearing housing 14 concerned. The upper end of the hub of a corresponding carrier 22 bears firmly against the lower surface of each cover plate or washer 21, said carrier hub being internally splined to co-operate with matching external splines provided on that portion of the shaft 2 under consideration that projects downwardly from beneath the bottom of its bearing housing 14. The hubs of the carrier 22 are maintained in firm abutting contact with the cover plates or washers 21, and are thus prevented from becoming axially displaces along the shafts 2, by washers 23 and retaining nuts 24 that co-operate with the lower ends of said hubs and with short screwthreaded lowermost parts of the shafts 2. Preferably, as illustrated in outline in FIG. 2, the screwthreaded portions of the shafts 2 and the co-operating retaining nuts 24 are furnished with transverse split pins or the like which positively prevent loosening of the retaining nuts that might otherwise occasionally occur during operation of the implement. Each carrier initially extends substantially horizontally away from its hub in two diametrically opposite directions but both diametrically opposed portions are then bent over downwardly to form corresponding stub shafts 23A whose longitudinal axes are in parallel, or substantially parallel, relationship with the longitudinal axis of the corresponding shaft 2, said longitudinal axes thus usually being vertically or substantially vertically disposed. Each stub shaft 23A has the hub 25 of a corresponding cultivating tool 33 mounted thereon in a freely rotatable manner. Three arms 26 project radially from each hub 25 at 120° intervals around the longitudinal axis of that hub and it can be seen from FIG. 3 of the drawings that the arms 26 taper gently in an outward direction away from the hubs 25. The outermost end of each arm 26 has a corresponding tine holder 27 rigidly secured to it, the holders 27 being of substantially cylindrical configuration but with their longitudinal axes in non-parallel relationship with the axes of rotation of the corresponding tools 33 that are physically afforded by the stub shafts 23A. The longitudinal axis of each substantially cylindrical tine holder 27 is inclined to a plane containing the longitudinal axis of the corresponding stub shaft 23A by an angle which preferably has a magnitude of substantially 15°. Furthermore, the longitudinal axes of the three tine holders 27 of each tool 33 are all similarly orientated in such a way as to extend upwardly and forwardly relative to the direction in which the tool 33 concerned will normally rotate about the axis of the co-operating stub shaft 23A during operation of the implement (see the heavy arrows in FIG. 3 of the drawings which denote these directions of rotation).

Each holder 27 receives the fastening portion 28 of a corresponding rigid soil working tine 29. Each tine 29 also has a straight soil working portion that extends downwardly from the lowermost end of its holder 27 into the soil during the use of the implement, the longitudinal axes of the straight fastening and soil working portions 28 and 30 of each tine 29 being coincident. The soil working portions 30 of the tines 29 taper very gently in a downward direction towards their rounded lowermost free ends or tips. An upper part of each fastening portion 28 is screwthreaded and co-operates with a fastening nut 31 to retain the tine 29 concerned firmly but releasably in connection with its holder 27. It will be noted that the upper ends of the holders 27 are disposed in non-perpendicular relationships with the longitudinal axes of those holders and, in fact, are slanted in such a way as to produce an upper protective portion 32 thereof that is foremost relative to the directions in which the tools 33 will usually rotate about the stub shafts 23A when the implement is in use. With this arrangement, the upper extremities of the screwthreaded parts of the fastening portions 28 and the corresponding nuts 31 are protected by the portions 32 of the tine holders 27 from being damaged by impacts against stones and the like which they may meet on or in soil that is being tilled. The cultivating tools 33 are freely rotatable about the axes defined by the corresponding stub shafts 23A and those axes are in parallel, or substantially parallel, relationship with the longitudinal axes of the shafts 2. The rotation of the tools 33 about the axes of the stub shafts 23A is caused, during operation of the machine, solely as a result of the configuration of the tools and their contact with the soil as the implement makes forward progress thereover in the direction A. The contact between the soil working portions 30 of the tines 29 and the soil is such that the tools 33 will normally rotate at a more or less steady rate in the directions that are indicated by the heavy arrows in FIG. 3 of the drawings so that said soil working portions 30 will trail rearwardly from top to bottom relative to those directions. It will be realised, however, that the free rotatability of the tools 33 about the stub shafts 23A enables any tool 33 which has one or more tines 29 that meet a firmly embedded stone or other obstacle in the soil to cease rotating temporarily until the obstacle is avoided or even to rotate momentarily in the opposite direction to normal to assist in the circumnavigation of such an obstacle.

The two cultivating tools 33 of each soil working or cultivating member 3 are so constructed and arranged that (see FIG. 3) they will revolve around the corresponding stub shafts 23A in opposite directions when the implement is in use subject, of course, to discontinuations and possible momentary reverses of their directions of rotation form the cause that has been discussed above. The small arrow that appear in FIG. 3 of the drawings show the directions in which the two soil working or cultivating members 3 that are visible in that Figure revolve, under power, during the operation of the implement and it will be realised that, when the tools 33 are revolving normally about their stub shafts 23A there will always be at least one tine 29 of each tool 33 moving rearwardly with respect to the directions of power driven rotation that has just been mentioned at a location generally (but not necessarily exactly) between the axis of rotation of the shaft 2 concerned and the axis of the stub shaft 23A of the tool 33 which bears such tine 29. The same is, of course, true of the arms 26 which form parts of the respective tools 33.

A substantially vertical, or at least upwardly extending shaft 34 (FIG. 1) is rotatably mounted by bearings in the hollow frame portion 1 at a location substantially centrally across the width of that frame portion and towards the rear thereof with respect to the direction A. The shaft 34 carries a straight-toothed or spur-toothed pinion 35A and said pinion 35A has its teeth in mesh with those of one of the center pair of the eight much larger pinions 17. The shaft 34 extends upwardly above the top of the hollow frame portion 1 into a gear box 35 that is fastened in position on top of said frame portion 1. A bevel pinion transmission (not visible) inside the gear box 35 places the shaft 34 in driven connection with a substantially horizontally disposed rotary input shaft 36 of the gear box that projects forwardly from the front thereof in substantially the direction A. The input shaft 36 is splined or otherwise keyed to enable it to be placed in driven connection with the power take-off shaft of an agricultural tractor or other operating vehicle by way of an intermediate telescopic transmission shaft 36A that is of a construction which is known per se, having universal joints at its opposite ends.

The opposite ends of the hollow frame portion 1 are closed by substantially vertically disposed side plates 37 that are in parallel relationship with each other and parallel or substantially parallel relationship with the direction A. Both of the side plates 37 project rearwardly with respect to the direction A beyond the back of the hollow frame portion 1 and there have corresponding arms 38 adjustably connected to them in such a way that the positions of the downwardly and rearwardly inclined arms 38 relative to the side plates 37 can be changed, the adjusting mechanism including bolts which can be tightened to maintain any chosen position of adjustment as long as may be desired. The lowermost and rearmost ends of the arms 38 carry a rotatable supporting member which is in the form of a ground roller 39 of open construction. The ground roller 39 extends throughout the combined working width of the eight soil working or cultivating members 3 and stub shafts at its opposite ends co-operate with substantially horizontally aligned bearings carried by the arms 38. The stub shafts are secured to a central tubular support 40 of the roller which support carries, at regular intervals along its length, a plurality, such as nine, of substantially circular plates 41 whose general planes are substantially vertically disposed in parallel relationship with each other and substantially parallel relationship with the direction A. Two of the regularly spaced apart plates 41 are located close to the opposite ends of the central support 40. The plates 41, that are perpendicular or substantially perpendicular to the longitudinal axis of the support 40, are formed close to their peripheries with a plurality of holes that are regularly spaced apart from one another around the longitudinal axis of the central support 40 and a number of elongate elements 42 of either tubular or solid rod-like formation are entered through at least some of the holes in the plates 41 so as to extend parallel to the longitudinal axis of the support 40. FIG. 1 of the drawings shows the provision of only four elements 42 but other numbers of those elements can be provided having regard to the soil conditions that are to be dealt with. Moreover, if preferred, the elements 42 may be arranged so as to extend helically around the longitudinal axis of the central support 40 rather than strictly parallel thereto as illustrated in FIG. 1. The front of the hollow frame portion 1 with respect to the direction A is provided with a coupling member or trestle 43 at a location midway between the general planes of the two side plates 37, said coupling member or trestle 43 being of generally triangualr configuration as seen in front or rear elevation. Two supports 44 both extend substantially parallel to the direction A on top of the hollow frame portion 1 so as rigidly to interconnect locations at the upper front and rear edges of said frame portion. Two strengthening tie beams 45 rigidly interconnect substantially the apex of the coupling member or trestle 43 and two locations on the repsective supports 44 that are close to the rearmost ends of those two supports, the two tie beams 45 extending downwardly and rearwardly with respect to the direction A from substantially the apex of the coupling member or trestle 43 in divergent relationship.

FIGS. 4 and 5 of the drawings illustrate a modification of the implement that has already been described with reference to FIGS. 1 to 3 thereof. In the embodiment of FIGS. 4 and 5 of the drawings, the hollow frame portion 1 is replaced by a hollow frame portion 1A that has the same lateral (with respect to the direction A) extent as the frame portion 1 and which serves the same purpose as that frame portion 1, the cross-sectional shape of the frame portion 1A being, however, different. The frame portion 1A comprises a lower part that is generally indicated by the reference 47, said lower part supporting a plurality (in this case, eight) of bearing housings 46. The lower part 47 of the hollow frame portion 1A is afforded by a metallic plate which is bent to form it into a plurality of mutually inclined planar portions. Firstly, the lower part 47 has a substantially horizontally disposed and basically flat bottom from the opposite front and rear (with respect to the direction A) edges of which further portions extend upwardly in divergent relationship from angular bends at said edges, the upwardly divergent portions each being inclined to the horizontal by an angle of substantially 45°. The uppermost edges of the upwardly divergent portions are bent over to form narrow substantially horizontally disposed and substantially coplanar lower clamping rims 48 which co-operate with the upper clamping rims 44 of the upper part 13 of the hollow frame portion 1A in exactly the same manner as has already been described for the co-operation between the lower clamping rims 7 and the upper clamping rims 14, the upper part 13 being, of course, identical to the upper part 13 that has already been described with reference to the embodiment of FIGS. 1 to 3 of the drawings. The bottom portion of the lower part 47 is formed, at equal distances inwardly towards the middle thereof from the sharp angular bends by which said bottom portion is integrally connected to the upwardly divergent portions, with two strengthening ribs 49 which both extend throughout the length (transverse to the direction A) of the frame portion 1A in parallel relationship with one another. It can be seen in FIG. 4 of the drawings that the two ribs 49 both project downwardly towards the ground surface from the remainder of the generally flat bottom portion and that they are of shallow V-shaped configuration as seen cross-section. Each rib 49, like the remaining portions of the bottom part 47, is formed by angularly bending the metal from which the lower part 47 is made to produce two generally planar limb portions which diverge upwardly away from the point of the "V". The upper edges of the two limb portions of each rib 49 are integrally connected by further sharp angular bends to the remainder of the generally flat bottom of the lower part 47.

The lower part 47 of the hollow frame portion 1A is formed, midway between the two strengthening ribs 49, with a row of eight (in this embodiment) circular apertures whose centers are spaced apart from one another by, preferably, 37.5 centimeters which, it will be remembered, is the preferred, but by no means essential, spacing between the longitudinal axes of the successive shafts 2. Each of the eight bearing housings 46 has a central substantially cylindrical portion 50, said bearing housing 46 being arranged principally inside the hollow frame portion 1A but with the lower end of its substantially cylindrical portion 50 projecting downwardly and outwardly therefrom through a respective one of the eight apertures in the bottom portion of the lower part 47.

In this embodiment, each bearing housing 46 has a rectangular, and preferably square, as illustrated, fastening portion 51 which is arranged immediately above the upper surface of the generally flat bottom portion of the lower part 47, eight substantially vertically disposed bolts 52 being employed to secure each fastening portion 51 firmly but releasably to the lower part 47. The positions in which the eight bolts 52 are arranged can be seen best in FIG. 5 of the drawings from the screwthreaded holes that are visible in that Figure and that are, of course, provided for cooperation with the bolts 52. It will be noted that each rib 49 is located substantially midway between each circular aperture in the lower part 47 and the corresponding leading or rear edge (with respect to the direction A) of that bottom portion at which there is a sharp angular bend integrally connecting the bottom portion to the respective upwardly divergent portion. Moreover, four of the eight bolts 52 which correspond to each bearing housing 46 are located inwardly towards the center thereof from the two ribs 49 whereas the other four bolts 52 are located outwardly thereof at the opposite sides of those ribs. Each bearing housing 46 is of cast or other integral construction and it will be noted that the rigid and integral connection between its central substantially cylindrical portion 50 and its square fastening portion 51 is strengthened by the provision of four upright ribs 53 that are located on top of the fastening portion 51 at 90° intervals around the upright longitudinal axis of the cylindrical portion 50 concerned.

In the use of the soil cultivating implement that has been described with reference to FIGS. 1 to 3 of the drawings or with reference to FIGS. 1 to 3 thereof as modified by the construction of FIGS. 4 and 5 of the drawings, its coupling member or trestle 43 is connected to the three-point lifting device or hitch at the rear of an agricultural tractor or other operating vehicle in a manner which is known per se and which can be seen, in outline, in FIG. 1 of the drawings. The forwardly projecting rotary input shaft 36 of the gear box 35 is placed in driven connection with the power take-off shaft of the agricultural tractor or other operating vehicle by way of the known intermediate telescopic transmission shaft 36A which has universal joints at its opposite ends and, before work commences, the positions of the arms 38 relative to the frame portion side plates 37 are adjusted, if reguired, to change the level of the axis of rotation of the ground roller 39 relative to that of the soil working or cultivating members 3 thus controlling the maximum depth to which the tines 29 of the cultivating tools 33 can penetrate into the soil. This adjustment will be made having regard to the nature and condition of the soil that is to be dealt with and the particular purpose for which it is intended after cultivation. As the implement moves forwardly over the ground in the direction A, the rotary drive that is applied to the input shaft 36 of the gear box 35 causes the eight soil working or cultivating members 3 to be positively rotated, under power, in the directions there are indicated by arrows in FIG. 1 of the drawings and by the smallest arrows in FIGS. 3 and 5 thereof. Due to the arrangement of the pinions 17, each member 3 revolves in the opposite direction to that of its immediate neighbour or to those of both of its immediate neighbours. Simultaneously, the cultivating tools 33 revolve about the axes defined by the stub shafts 23A in the directions that are indicated by larger arrows in FIGS. 3 and 5 of the drawings subject to minor irregularities that may occur from the cause discussed above. This rotation is caused solely by the contact of the soil working portions 30 of the tines 29 with the ground, there being no positive power drive to the tools 33 as there is to the soil working or cultivating members 3 as a whole. Since, excluding minor variations in the regular rotation of the tools 33, the two tools 33 of each member 3 revolve in opposite directions about the corresponding stub shafts 23A, the soil that passes between them is subject to an intensive crumbling action by the co-operating tines 29 which action is most important from the point of view of effective cultivation, particularly when the soil that is being dealt with is heavy soil in a wet condition.

It will be evident from FIG. 1 of the drawings that each soil working or cultivating member 3 has an effective working width which is a little greater than is the distance (preferably 37.5 centimeters) between the axes of rotation of two immediately neighbouring members 3. Thus, the eight members 3 work overlapping strips of soil and thus, effectively, a single broad strip which, with the preferred dimensions, will have a width of substantially 3 meters.

It would be possible to arrange the tine holders 27 of the various tools 33 in such positions that, for each member 3, all of them, and thus the corresponding tines 29, were inclined in the same direction relative to the respective axes of rotation defined by the two stub shafts 23A. This would be in contradistinction to the illustrated arrangement in which the holders 27 of one tool 33 in each member 3 are inclined in the opposite direction to the holders 27 of the other tool 33 of the same member 3. With this possible arrangement, the two tools 33 of each member 3 would be ground driven to revolve in the same directions during operation of the implement rather than in opposite directions. The arrangement would be such that the tines 29 would move principally rearwardly between the axes of rotation of the shafts 2 and the axes of rotation (afforded by the stub shafts 23A) of the tools 33 when the latter axes of rotation were being moved forwardly through their circular paths of positive displacement about the axes of the shafts 2.

Since each positively rotated soil working or cultivating member 3 is provided with at least two freely rotatable cultivating tools 33, the shafts 2 which embody the axes of rotation of the members 3 are subject to heavy forces tending to displace them. Such forces must, of course, be absorbed by the rotary supports of the shafts 2 if the implement is to continue to function in the required manner. The required rotary support of the shafts 2 is provided in a simple but very efficient manner by the described and illustrated bearing housings 4 or 46. The trough 6 affords a deformation of the lower part 5 of the hollow frame portion 1 and the strengthening ribs 49 afford deformations of the lower part 47 of the hollow frame portion 1A and the provision of these deformations effectively reinforces the mountings of the bearing housings 4 and 46 in the frame portions 1 and 1A. The lower parts 5 and 47 of the hollow frame portions 1 and 1A are capable of withstanding the forces referred to above as a result of the large areas of contact which exist between them and the fastening portions 9 and 51 of the bearing housings 4 and 46. In both of the embodiments which have been described and that are illustrated in the accompanying drawings, the fastening portions 9 and 51 are of polygonal configuration when seen in plan view, the preferred configuration being square or at least rectangular. Circles that substantially contain the corners of the polygonal fastening portions have, in the embodiments described, diameters of substantially 30 centimeters and this magnitude considerably exceeds the radius of each toothed pinion 17 which radius, in the described embodiments, has an effective magnitude of substantially 18.75 centimeters. The polygonal configuration of the fastening portion flange 9A and the fastening portions 51 enables those fastening portions to be secured readily against rotation. However, a square, other rectangular or other polygonal configuration of the fastening portions is not absolutely essential and, if preferred, the fastening portions may be provided with circumferential configurations that are circular or substantially circular as seen in plan view.

Although certain features of the soil cultivating implement embodiments that have been described and/or that are illustrated in the accompanying drawings will be set forth in the following claims as inventive features, it is emphasised that the invention is not necessarily limited to those features and that it includes within its scope each of the parts of each soil cultivating implement embodiment that has been described, and/or that is illustrated in the accompanying drawings, both individually and in various combinations.

What we claim is:

1. A soil cultivating implement comprising a frame and a plurality of soil working members journalled in an elongated hollow portion of said frame, each member being rotatable about a corresponding upwardly extending axis defined by a shaft and said shaft being mounted in bearing means, said bearing means being supported in a housing and the latter being at least partly located within the hollow portion, said housing having an upper fastening portion which comprises a flange that is located within the frame portion and said flange surrounding an aperture in a lower part of said frame portion, driving means housed within said frame portion and including a respective toothed pinion located above the corresponding housing on the respective shaft of each soil working member, said lower frame portion part forming a trough, the sides of which extend upwardly and a portion of the housing being configured to fit in said trough, said flange overlying the trough and extending beyond the sides thereof, means fastening said flange to the lower part of the frame portion.

2. An implement as claimed in claim 1, wherein said lower part is a profiled metal sheet that has been deformed to accomodate said housing.

3. An implement as claimed in claim 2, wherein said deformation extends throughout substantially the length of said frame portion.

4. An implement as claimed in claim 1, wherein said housing is hollow and substantially frusto-conical in configuration.

5. An implement as claimed in claim 1, wherein said secured to said lower part of the frame portion, said lower part being a profiled plate that is substantially flat with at least one strengthening rib.

6. An implement as claimed in claim 5, wherein the fastening portion of said housing is secured to said lower part by bolts located at opposite sides of said rib.

7. A soil cultivating implement comprising a frame and a plurality of soil working members journalled in an elongated hollow portion of said frame, each member being rotatable about a corresponding upwardly extending axis defined by a shaft and said shaft being mounted in bearing means, said bearing means being supported in a housing and the latter being at least partly located within the hollow portion, said housing having an upper fastening portion which comprises a flange that is located within the frame portion and said flange surrounding an aperture in a lower part of said frame portion, driving means housed within said frame portion and including a respective toothed pinion located above the corresponding housing on the respective shaft of each soil working member, said housing having a lower portion which extends through said aperture and below said frame portion, the lower part of said frame portion extending upwardly, in part, adjacent the bottom of said flange and the latter being fastened to the lower part of said frame portion, the upwardly extending portion of said lower part being a deformation of that part, and said housing being supported on said frame portion at locations on different horizontal levels.

8. An implement as claimed in claim 7, wherein said flange is a relatively thick casting.

* * * * *